Figure 1:
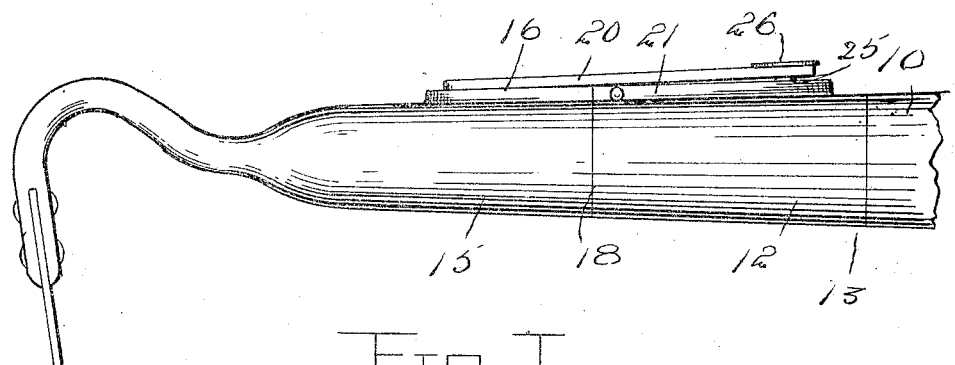

No. 844,130. PATENTED FEB. 12, 1907.
J. N. HOWARD.
TOOL HANDLE.
APPLICATION FILED APR. 19, 1906. RENEWED JAN. 9, 1907.

2 SHEETS—SHEET 1.

Inventor
Jasper N. Howard.

Witnesses
J. C. Simpson
H. B. MacThot

By Chandlee & Chandlee
Attorneys

No. 844,130.
PATENTED FEB. 12, 1907.
J. N. HOWARD.
TOOL HANDLE.
APPLICATION FILED APR. 19, 1906. RENEWED JAN. 9, 1907.
2 SHEETS—SHEET 2.
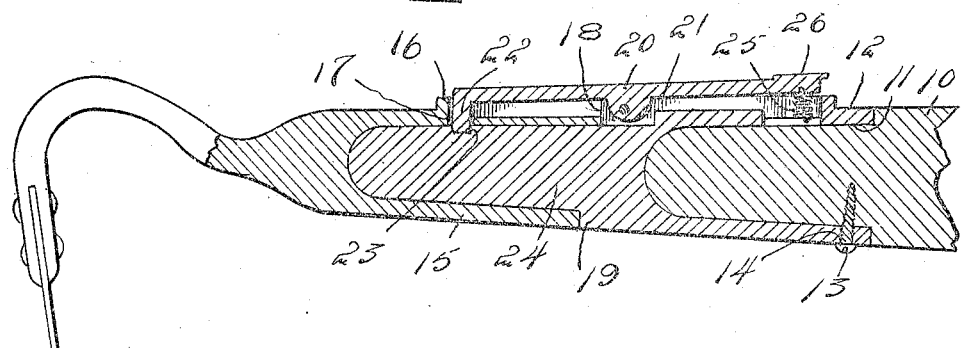
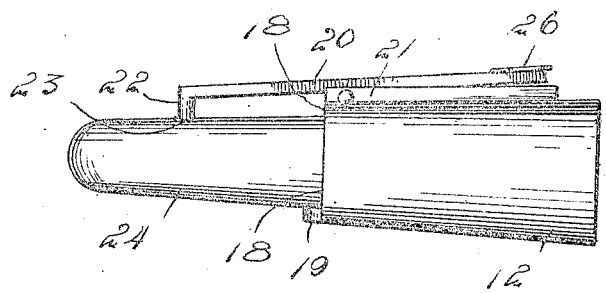
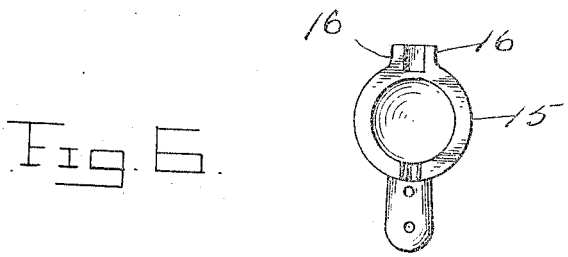
Witnesses
Inventor
Jasper N. Howard
By Chandler & Chandler
Attorneys

UNITED STATES PATENT OFFICE.

JASPER N. HOWARD, OF LAGRANGE, INDIANA.

TOOL-HANDLE.

No. 844,130.      Specification of Letters Patent.      Patented Feb. 12, 1907.

Application filed April 19, 1906. Renewed January 9, 1907. Serial No. 351,569.

*To all whom it may concern:*

Be it known that I, JASPER N. HOWARD, a citizen of the United States, residing at Lagrange, in the county of Lagrange, State of Indiana, have invented certain new and useful Improvements in Tool-Handles; and I do hereby declare the following to be a full, clear, and exact description of the invention, such as will enable others skilled in the art to which it appertains to make and use the same.

This invention has relation to tool-handles of the kind that are detachable from the tool in order to suit a special tool to the handle in order to use it to the best advantage in the performance of work, to which that particular tool is adapted.

It is the purpose of the invention to produce a simplified structure in order that the improvement may be manufactured at low cost and be easily understood and operated.

It is a further object of the invention to form it so that the tool may be rigidly and securely fastened to or upon the handle and also to construct the handle so that the parts and features belonging to it shall perform their functions with entire certainty.

The invention consists of a tool-handle having the improved structural characteristics shown in the drawings and hereinafter disclosed.

The invention will first be described in detail in connection with the annexed drawings, forming a part of this specification, and then be pointed out in the subjoined claims.

Figure 2:
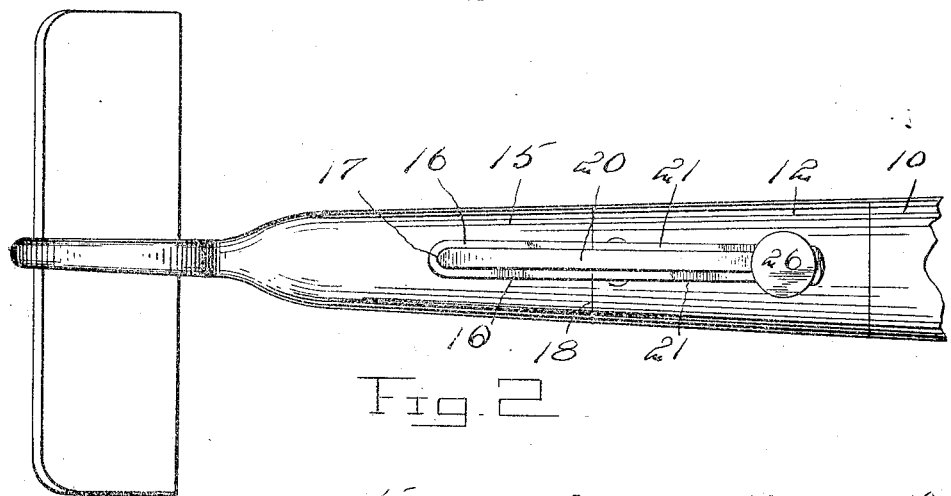
Figure 3:
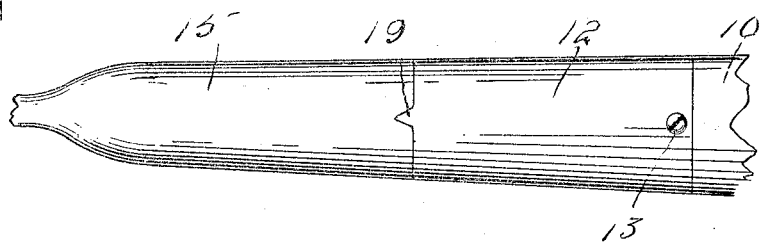

Of the said drawings, Figure 1 is a side elevation showing the use of the present invention. Fig. 2 is a top plan view. Fig. 3 is a bottom plan of a portion of the structure. Fig. 4 is a vertical longitudinal section. Fig. 5 is an elevation of the rear ferrule. Fig. 6 is a rear end elevation of the front ferrule.

The same figures of reference designate the same parts or features, as the case may be, wherever they occur.

In the drawings, 10 designates a wooden handle consisting of a straight round pole, as shown in Fig. 5, though it may be of any other suitable form—such, for example, as that shown in Fig. 6.

The tool-bearing end of the wooden handle will be formed so as to fit securely in the socket 11 of the ferrule 12, and a screw 13 may be driven through the hole 14 in the bottom of the said ferrule and into the end of the handle to fasten the latter with all required security.

The tool proper, which may be a rake, hoe, fork, spade, shovel, or other implement or tool, will be provided with the socketed ferrule 15, having two ribs or flanges 16 on its upper rearward part, between which is a groove formed in the ferrule terminating at its forward end in a hole 17, opening into the socket of the ferrule. There is also a V-shaped notch formed in the rear edge of the ferrule 15 for a purpose that will presently appear.

The ferrule 12 has its forward end reduced in diameter, as at 24, so as to fit the socket of the ferrule 15 quite tightly and have the rear edge of the latter socket abut against the shoulder 18 of the ferrule 12, which shoulder on the under side has a V-shaped projection 19 to fit the notch of corresponding form before mentioned as formed in the edge of the ferrule 15 when the parts are in properly-adjusted position, and thus provide one of the means afforded for keeping the two ferrules in proper position with respect to each other.

A thumb-lever 20 is fulcrumed between two ribs 21 on top of the ferrule 12 and is provided on its forward end with a pin 22, extending vertically and at right angles to the lever, so that when the parts are joined said pin 22 will extend through the hole 17 in the ferrule 15, with the point of said pin passing into a hole 23, formed in the upper side of the reduced end 24, that enters the socket of the ferrule 15, the said pin by this manner being held at both its upper and inner ends so that it cannot be displaced and so that it will hold the ferrule 12 in place with security and certainty. A helical spring 25 is arranged under the rear end of lever 20 to keep the pin 22 normally down, and a plate 26 is formed on the upper side of the rear end of the lever as a means for the thumb of the hand of the operator to rest upon in pressing that end of the lever down to release the pin 22 from its fastening engagements.

Inasmuch as the socketed ferrule 15 will be integrally or otherwise connected with the shank of the tool, it may with propriety be called a "tool-socketed ferrule," and the other ferrule to be affixed to the wooden handle may be termed a "handle-socketed ferrule."

By the means described a handle may be produced for use upon a variety of different tools, such as a rake, a hoe, &c.

What is claimed as the invention is—

1. A tool-socketed ferrule provided on its upper side with two ribs, a longitudinal groove between said ribs, a hole at the end of said groove opening into the socket, combined with a handle-socketed ferrule having its forward end reduced to extend into the socket of the tool-ferrule, a recess formed in the upper side of the said reduced portion, a spring-pressed lever pivoted on the handle-ferrule and having a pin on its end adapted to pass through the hole in the tool-ferrule and at its end to enter the recess formed in the reduced portion of the handle-ferrule, the forward portion of said spring-pressed lever resting between the said ribs and in said groove.

2. A handle-socketed ferrule provided with a hole opening into the socket, a reduced portion at its forward end forming a shoulder, a V-shaped projection on said shoulder, two ribs on upper side of said ferrule, a spring-pressed pin-bearing lever arranged between said ribs and pivoted on said ferrule, combined with a tool-socketed ferrule adapted to receive in its socket the reduced part of the first-mentioned ferrule and having a V-shaped notch on its edge to receive the said V-shaped projection, a hole formed through the said tool-socketed ferrule, and a recess made in the upper surface of said reduced part of the first-mentioned ferrule, the pin on the said spring-pressed lever entering the hole in the opposite ferrule and resting at its end in the recess formed in the said reduced portion, and a pin driven through the hole formed through the first-mentioned ferrule into the wooden handle.

3. A tool having a shank provided with a socketed ferrule having a groove on its upper side, a hole opening into the socket at the end of said groove and a V-shaped notch in its rear edge, combined with a handle having a ferrule provided with a socket into which the end of the handle extends, a hole formed in the ferrule and opening into the socket, a pin driven through said hole into the portion of the handle in the socket, the forward part of the latter ferrule being reduced, forming a shoulder at the base of the reduced portion, the latter extending into the socket of the first-mentioned ferrule, a V-shaped projection on said shoulder to fit into the V-shaped notch on the former ferrule, and a spring-pressed lever provided with an inwardly-projecting pin to extend at its forward end through the hole in the first-mentioned socket and at its end into the recess of the reduced end.

In testimony whereof I affix my signature in presence of two witnesses.

JASPER N. HOWARD.

Witnesses:
FRANCIS D. MERRITT,
WILLIAM H. DUFF.